June 22, 1926.

W. R. DICK

ROASTER AND SIMILAR UTENSIL

Filed June 15, 1925

1,589,588

Inventor
WILLIAM R. DICK

By A. B. Bowman

Attorney

Patented June 22, 1926.

1,589,588

UNITED STATES PATENT OFFICE.

WILLIAM R. DICK, OF SAN DIEGO, CALIFORNIA.

ROASTER AND SIMILAR UTENSIL.

Application filed June 15, 1925. Serial No. 37,045.

My invention relates to roasters and similar utensils, and the objects of my invention are: first, to provide a utensil whereby only indirect heat is applied substantially uniformly on all sides including the bottom and top portions of a receptacle positioned within and forming a part of the utensil; second, to provide a utensil of this class having an inner cooking, roasting or baking receptacle and an outer heating receptacle spaced on all sides from the former and provided at the outer portions of its bottom with a plurality of openings whereby hot gases are permitted to readily enter the space between said receptacles and freely circulate around the bottom, sides and top portion of the inner receptacle for uniformly heating the same on all sides; third, to provide a utensil of this class having controllable vents in the cover or top portion of the outer heating receptacle whereby the heat adapted to be applied around the outer walls of the inner receptacle may be easily controlled; fourth, to provide a utensil of this class having a roasting, cooking or baking receptacle provided with an extended perforated flange at the periphery of its upper portion for supporting the same at the upper end of the bottom portion of a heating receptacle, the utensil being provided with a double-walled cover adapted to be positioned, respectively, over the lower cooking, roasting or baking receptacle and the lower portion of the heating receptacle and provided with ports at its lower portion adapted to register with the ports in the peripheral supporting flange of the lower inner receptacle to permit the passage of hot gases between the double walls of the cover of the utensil; fifth, to provide novel means for retaining the separate cover members of the utensil together as a single cover and yet permit the same to be readily separated for cleaning the same; sixth, to provide as a whole a novelly constructed utensil of this class, and seventh, to provide a utensil of this class which is particularly simple and economical of construction, durable, and which will not readily deteriorate or get out of order.

Figures 1, 5:
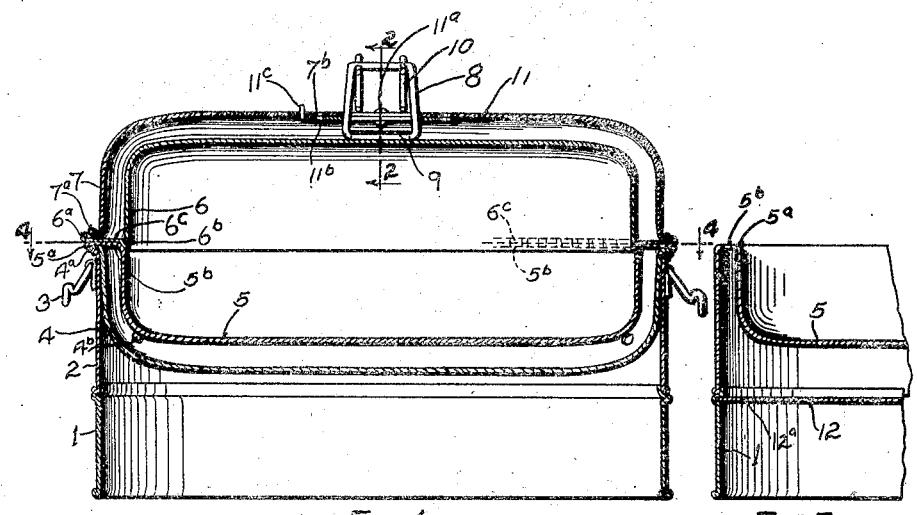
Figures 2, 3:
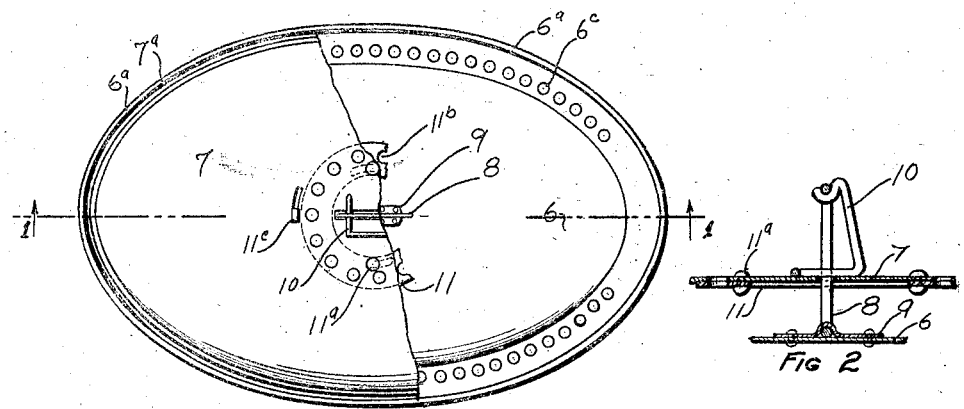
Figure 4:
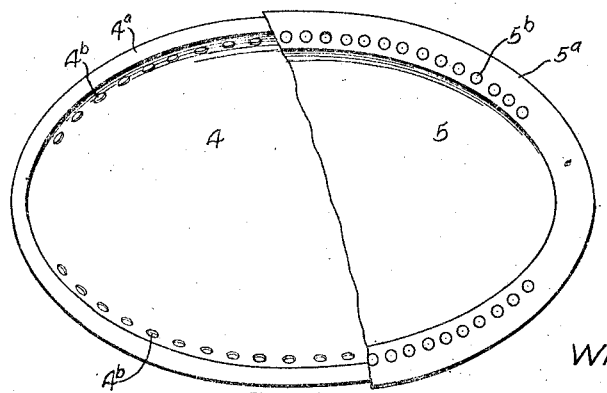

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a longitudinal sectional elevational view of my utensil constructed in the form of a roaster, with the section taken through 1—1 of Fig. 3, certain parts and portions thereof being shown in elevation to facilitate the illustration; Fig. 2 is an enlarged fragmentary sectional view of the handle and cover securing means thereof, taken through 2—2 of Fig. 1; Fig. 3 is a top view thereof, showing the outer cover and vent regulating means partly broken away to facilitate the illustration; Fig. 4 is a top view of the lower portion of the roaster, showing the cooking, roasting or baking receptacle partially broken away to facilitate the illustration, and Fig. 5 is a fragmentary sectional elevational view, similar to that shown in Fig. 1, of the lower portion only of my roaster in a slightly modified form of construction.

Like characters of reference refer to similar parts and portions throughout the several views of the drawings.

The base members 1 and 2, handles 3, outer receptacle 4, inner receptacle 5, inner cover 6, outer cover 7, handle 8, clip 9, cover connecting member 10, and the heat regulating member 11, constitute the principal parts and portions of my roaster in its preferred form of construction.

The base members 1 and 2 for supporting the roaster above a flame or other heating means, and the outer and inner receptacles 4 and 5, respectively, as well as the covers 6 and 7, are preferably made elliptical. The base of my roaster is sectional and consists of the base members 1 and 2, the latter positioned above and readily separable from the former so that the receptacles 4 and 5 may be variously positioned above the heating means as desired, depending upon the kind or class of victuals adapted to be prepared. These base members 1 and 2 are upright and constructed in general cylindrical form. The upper base member 2 is preferably provided at its opposite ends with handle members 3, which may be so constructed as to secure the cover members 6 and 7 against the lower portion of the roaster.

The outer heating receptacle 4 is positioned within the base member 2 and provided at its upper end with an outwardly extending flange 4ª adapted to support said receptacle on the upper edge of the base member 2. The side walls of the outer receptacle 4 are made substantially straight so as to reduce the space between the receptacle 4 and the inner side of the base member 2 to a minimum and more effectively direct the hot gases of combustion from the heating means positioned below the base, through the ports 4ᵇ provided around the bottom of the outer heating receptacle 4. The inner, or food containing, receptacle 5 is positioned above the bottom and spaced from the side walls of the receptacle 4, and is provided at its upper end with an outwardly extending flange 5ª which supports the inner receptacle 5 at the upper end of and in spaced relation relatively to the receptacle 4. The cover 6 for the inner receptacle 5 is shaped similarly to the receptacle 5 and is provided at its lower end with an outwardly extending flange 6ª which rests on the flange 5ª, supporting the cover 6 relatively to the receptacle 5, there being preferably provided a peripheral downwardly extending portion or flange 6ᵇ at the lower inner end of the cover 6 which extends into the upper end of the receptacle 5 for fixedly positioning the same relatively to each other. Around the inner cover 6 and in spaced relation thereto is an outer heat retaining cover 7, shaped similarly to the outer receptacle 4. The lower peripheral edge of the cover 7 is provided with a beaded portion 7ª which rests on the flange 6ª of the cover 6 and is positioned relatively thereto by a corresponding beaded portion at the outer edge of the flange 6ª.

The flange 5ª of the receptacle 5 is provided with a plurality of openings or ports 5ᵇ which may extend completely around said flange, as shown. These ports 5ᵇ register with corresponding ports 6ᶜ in the outwardly extending flange 6ª of the inner cover 6.

The inner cover 6 is provided with a handle member 8 which is pivotally connected thereto by means of a clip 9. The handle member 8 extends upwardly through a slot in the middle portion of the outer cover member 7, as shown, and is locked in such position relatively thereto by means of a wire securing member 10, looped under the outer end of the handle member and resting with a flat portion at the outer side of the cover 7 and between the upright portions of the handle member 8, as shown. This member 10 is adapted to temporarily secure the two cover members 6 and 7 together as a unit when using the roaster, but permits the same to be readily separated for cleaning the same when desired.

Through the upper middle portion of the outer cover 7, around the slot through which the handle member 8 extends, is provided a plurality of circularly arranged vents 7ᵇ. On the under side of the middle portion of the outer cover 7 is secured, by means of a pair of rivets 11ª, a vent controlling member or ring 11, which is provided with a plurality of circularly arranged ports 11ᵇ adapted to register with the ports 7ᵇ in the cover member 7 for permitting the discharge of the hot gases from the space between the cover members or for variously controlling such discharge. The vent controlling ring 11 is preferably provided with a shifting lug 11ᵇ which extends upwardly through an arcuate slot in the cover member 7 for shifting the member 11.

Thus it will be seen that a relatively more intense heat may be applied at the bottom of the receptacle or vessel 5 by covering or partially covering the ports 7ᵇ at the upper middle portion of the cover 7 for obtaining a substantially instantaneous intense heat, which may be gradually modified as the contents of the receptacle 5 become heated by opening the ports 7ᵇ.

In the modified form of construction of my roaster, as shown fragmentarily in Fig. 5, I have eliminated the outer receptacle 4 and substituted a heat diverting plate 12 which is positioned below the bottom of the receptacle 5 and preferably secured at its peripheral portion at the upper end of the lower base member 1. This plate 12 is also provided with ports 12ª arranged substantially as in the outer receptacle 4 in the preferred structure. It will be noted that the heat diverting plate 12 may also be supported at the lower end of the upper base member 2, if desired, without deviating from the spirit of the invention. The receptacle 5, in this modified form of construction, is made an integral part of the base member 2 and connected therewith by a portion 5ª corresponding with the flange 5ª in the preferred structure. This portion 5ª is also provided with ports 5ᵇ as in the other structure described, for permitting the passage of hot gases into the space between the cover members, which cover members are preferably identically constructed for the modified lower portion of my roaster, shown in Fig. 5.

Though I have shown and described a particular construction, combination and arrangement of parts and portions and a certain modification thereof, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. In a utensil of the class described, a base of substantially cylindrical form, a heat diverting member positioned therein and provided with openings at its periphery, a receptacle supported at the upper end of said base, there being provided upwardly directed openings between the main portion of said receptacle and said base, a cover for said receptacle, and a cover for said base, there being provided openings between the lower ends of said covers registering with said first mentioned openings.

2. In a utensil of the class described, a base of substantially cylindrical form, a heat diverting member positioned therein and provided with openings at its periphery, a receptacle supported at the upper end of said base, there being provided upwardly directed openings between the main portion of said receptacle and said base, a cover for said receptacle, a cover for said base, there being provided openings between the lower ends of said covers registering with said first mentioned openings, and handle means securing said covers together as a unit.

3. In a utensil of the class described, a base of substantially cylindrical form, a heat diverting member positioned therein and provided with openings at its periphery, a receptacle supported at the upper end of said base, there being provided upwardly directed openings between the main portion of said receptacle and said base, a cover for said receptacle, a cover for said base, there being provided openings between the lower ends of said covers registering with said first mentioned openings, the cover for said base being provided at the middle of its upper portion with vents, and a vent controlling means mounted on said last mentioned cover for variously opening and closing said vents.

4. In a utensil of the class described, a base of substantially cylindrical form, a heat diverting member positioned therein and provided with openings at its periphery, a receptacle supported at the upper end of said base, there being provided upwardly directed openings between the main portion of said receptacle and said base, a cover for said receptacle, a cover for said base, there being provided openings between the lower ends of said covers registering with said first mentioned openings, handle means securing said covers together as a unit, the cover for said base being provided with vents at its upper portion, and vent controlling means mounted on said last mentioned cover for variously opening and closing said vents.

5. In a utensil of the class described, a base of substantially cylindrical form, a heat diverting member positioned therein and provided with openings at its periphery, a receptacle supported at the upper end of said base, there being provided upwardly directed openings between the main portion of said receptacle and said base, a cover for said receptacle, a cover for said base, there being provided openings between the lower ends of said covers registering with said first mentioned openings, handle means securing said covers together as a unit, the cover for said base being provided with vents surrounding said handle means, and a ported vent controlling member mounted on said last mentioned cover for variously opening and closing said vents.

6. In a utensil of the class described, a base, a substantially flat heat diverting member positioned within and supported by said base and provided near its periphery with a plurality of ports, a receptacle positioned within the upper portion of said base and spaced at its sides therefrom and at its bottom from said heat diverting member, the portion connecting said receptacle and the upper portion of said base being provided with a plurality of openings, and a double-walled cover provided with openings at its lower end adapted to register with the openings in the portion connecting said receptacle with said base.

7. In a utensil of the class described, a base, a substantially flat heat diverting member positioned within and supported by said base and provided near its periphery with a plurality of ports, a receptacle positioned within the upper portion of said base and spaced at its sides therefrom and at its bottom from said heat diverting member, the portion connecting said receptacle and the upper portion of said base being provided with a plurality of openings, a cover for said receptacle provided at its lower end with an outwardly extending flange adapted to support said cover over said receptacle and provided with openings adapted to register with the openings in the portion connecting said receptacle with said base, and an outer cover spaced from said first mentioned cover and supported at its lower end on said flange.

8. In a utensil of the class described, a base, a substantially flat heat diverting member positioned within and supported by said base and provided near its periphery with a plurality of ports, a receptacle positioned within the upper portion of said base and spaced at its sides therefrom and at its bottom from said heat diverting member, the portion connecting said receptacle and the upper portion of said base being provided with a plurality of openings, a cover for said receptacle provided at its lower end with an outwardly extending flange adapted to support said cover over said receptacle and provided with openings adapted to register with the openings in the portion connecting said receptacle with said base, an outer cover spaced from said first mentioned cover and supported at its lower end on said flange, and means for removably connecting said covers as a unit cover.

9. In a utensil of the class described, a base, a substantially flat heat diverting member positioned within and supported by said base and provided near its periphery with a plurality of ports, a receptacle positioned within the upper portion of said base and spaced at its sides therefrom and at its bottom from said heat diverting member, the portion connecting said receptacle and the upper portion of said base being provided with a plurality of openings, a cover for said receptacle provided at its lower end with an outwardly extending flange adapted to support said cover over said receptacle and provided with openings adapted to register with the openings in the portion connecting said receptacle with said base, an outer cover spaced from said first mentioned cover and supported at its lower end on said flange, and adjustable vent means in the upper portion of said last mentioned cover.

10. In a utensil of the class described, an upright base member of substantially cylindrical construction, an outer receptacle positioned within the upper portion of said base member and supported at the upper end thereof and provided in its bottom with a plurality of ports, an inner receptacle positioned within said outer receptacle and spaced on all sides therefrom and provided at its upper end with an outwardly extending flange adapted to rest at the upper end of said base member, said flange being provided with a plurality of ports, an inner cover for said inner receptacle provided at its lower end with an outwardly extending flange having a plurality of ports adapted to register with the ports in said first mentioned flange, and an outer cover resting with its lower end on the flange of said inner cover and spaced on all sides therefrom, providing a continuous space for hot gases around said inner receptacle and said inner cover.

11. In a utensil of the class described, an upright base member of substantially cylindrical construction, an outer receptacle positioned within the upper portion of said base member and supported at the upper end thereof and provided in its bottom with a plurality of ports, an inner receptacle positioned within said outer receptacle and spaced on all sides therefrom and provided at its upper end with an outwardly extending flange adapted to rest at the upper end of said base member, said flange being provided with a plurality of ports, an inner cover for said inner receptacle provided at its lower end with an outwardly extending flange having a plurality of ports adapted to register with the ports in said first mentioned flange, an outer cover resting with its lower end on the flange of said inner cover and spaced on all sides therefrom, providing a continuous space for hot gases around said inner receptacle and said inner cover, a handle for said inner cover extending through said outer cover, and a resilient member securing the outer end of said handle relatively to said outer cover.

12. In a utensil of the class described, a sectional base comprising substantially upright cylindrical base members positioned one above the other, an outer receptacle positioned within the upper base member and removably supported at the upper end thereof, said receptacle being provided with a plurality of ports in its bottom, an inner receptacle positioned within and spaced at its sides and bottom from said outer receptacle and provided at its upper end with an outwardly extending flange adapted to removably rest at the upper end of said outer receptacle, said flange being provided with a plurality of upwardly directed ports, a cover for said inner receptacle provided at its lower end with an outwardly extending flange adapted to support said cover on the flange of said inner receptacle and provided with a plurality of ports adapted to register with the ports in the flange of said inner receptacle, and an outer cover resting at its lower end on the outwardly extending flange of said first mentioned cover.

13. In a utensil of the class described, a sectional base comprising substantially upright cylindrical base members positioned one above the other, an outer receptacle positioned within the upper base member and removably supported at the upper end thereof, said receptacle being provided with a plurality of ports in its bottom, an inner receptacle positioned within and spaced at its sides and bottom from said outer receptacle and provided at its upper end with an outwardly extending flange adapted to removably rest at the upper end of said outer receptacle, said flange being provided with a plurality of upwardly directed ports, a cover for said inner receptacle provided at its lower end with an outwardly extending flange adapted to support said cover on the flange of said inner receptacle and provided with a plurality of ports adapted to register with the ports in the flange of said inner receptacle, an outer cover resting at its lower end on the outwardly extending flange of said first mentioned cover, and handle means securing said covers together as a unit.

In testimony whereof, I have hereunto set my hand at San Diego, California, this 8th day of June, 1925.

WILLIAM R. DICK.